United States Patent [19]

Walker, Jr. et al.

[11] Patent Number: 4,560,628

[45] Date of Patent: Dec. 24, 1985

[54] HIGH CAPACITY INORGANIC OXYHALIDE ELECTROCHEMICAL CELL

[75] Inventors: Charles W. Walker, Jr., Freehold; William L. Wade, Jr., Neptune, both of N.J.; Michael Binder, Brooklyn, N.Y.; Sol Gilman, Rumson, N.J.

[73] Assignee: The United States of America as represented by the Secretary of the Army, Washington, D.C.

[21] Appl. No.: 653,116

[22] Filed: Sep. 21, 1984

[51] Int. Cl.$^4$ .............................................. H01M 4/36
[52] U.S. Cl. .................................... 429/105; 429/196; 429/198; 429/201
[58] Field of Search ............... 429/196, 105, 198, 199, 429/201

[56] References Cited

U.S. PATENT DOCUMENTS

| | | | |
|---|---|---|---|
| 4,352,866 | 10/1982 | Klinedinst et al. | 429/196 |
| 4,416,957 | 11/1983 | Goebel et al. | 429/196 x |
| 4,476,204 | 10/1984 | Auborn | 429/196 |
| 4,482,616 | 11/1984 | Connolly et al. | 429/201 X |

*Primary Examiner*—Charles F. LeFevour
*Attorney, Agent, or Firm*—Anthony T. Lane; Jeremiah G. Murray; Roy E. Gordon

[57] ABSTRACT

A high capacity lithium inorganic oxyhalide electrochemical cell is provided including lithium as the anode, carbon as the cathode, and a solution of a quaternary ammonium salt in an inorganic oxyhalide solvent as the electrolyte.

6 Claims, No Drawings

HIGH CAPACITY INORGANIC OXYHALIDE ELECTROCHEMICAL CELL

The invention described herein may be manufactured, used, and licensed by or for the Government for Governmental purposes without the payment to us of any royalty thereon.

This invention relates in general to a high capacity lithium inorganic oxyhalide electrochemical cell and in particular to such a cell using a solution of a quaternary ammonium salt in an inorganic oxyhalide solvent as the electrolyte.

BACKGROUND OF THE INVENTION

The most commonly used electrolyte salt for lithium inorganic oxyhalide electrochemical cells as for example lithium sulfuryl chloride ($SO_2Cl_2$) and thionyl chloride ($SOCl_2$) cells has been $LiAlCl_4$. However, cell capacity is normally limited by accumulation of lithium chloride at the carbon cathode. Chloride ions are formed at the cathode during reduction of the solvent and lithium ions are present in the $LiAlCl_4$ salt as well as being formed by oxidation of the lithium anode. Thus, lithium chloride is formed as a cell discharge product in sulfuryl chloride and thionyl chloride.

In sulfuryl chloride, the reaction can be represented as:

$$2Li \rightarrow 2Li^+ + 2e^-$$

$$2e^- + SO_2Cl_2 \rightarrow SO_2 + 2Cl^-$$

The net result is the formation of $2LiCl + SO_2$.

In thionyl chloride, the reaction can be represented as:

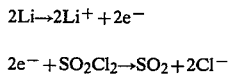

$$4e^- + 2SOCl_2 \rightarrow SO_2 + S + 4Cl^-$$

The net result is the formation of $4LiCl + SO_2 + S$.

The low solubility of LiCl in these solvents results in LiCl precipitating and clogging the pores and surface of the carbon cathode. Cathode activity is reduced, leading to cell failure. Although at low constant current discharge rates LiCl is fairly evenly distributed throughout the cathode allowing a relatively long capacity, at high discharge rates the LiCl tends to deposit mainly on the cathode surface. The interior of the cathode is not utilized, the surface is quickly coated with LiCl, and capacity is greatly decreased.

SUMMARY OF THE INVENTION

The general object of this invention is to provide a high capacity lithium inorganic oxyhalide electrochemical cell. A further object of the invention is to provide such a cell wherein LiCl will not clog the pores and surface of the carbon cathode.

The aforementioned objects have now been attained by providing a high capacity inorganic oxyhalide electrochemical cell including lithium as the anode, carbon as the cathode, and a solution of a quaternary ammonium salt in an inorganic oxyhalide solvent as the electrolyte.

As the quaternary ammonium salt, one may use salts such as tetrapropylammoniumtetrachloroaluminate or tetrabutylammoniumtetrachloroaluminate, of which the latter is preferred.

As the inorganic oxyhalide solvent, one may use sulfuryl chloride or thionyl chloride.

The use of the quaternary ammonium salt as the electrolyte salt is believed to be of advantage because the quaternary ammonium salts are soluble in thionyl chloride and sulfuryl chloride. Moreover, the quaternary ammonium salts have a high specific conductivity and are stable to oxidation by thionyl chloride and sulfuryl chloride or reduction by lithium. Then too, the cation of the salt forms a soluble stable chloride salt in thionyl chloride and sulfuryl chloride. Moreover, the anion forms a soluble, stable lithium salt in thionyl chloride and sulfuryl chloride.

By using the quaternary ammonium salt, unwanted precipitation of LiCl will not occur within the cathode pores nor at the anode surface but at some intermediate point between the cathode and anode.

When using tetrabutylammoniumtetrachloroaluminate as the electrolyte salt, Li and Cl are complexed in a soluble form according to the reaction:

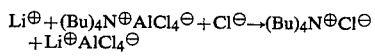

This allows formation of $(Bu)_4NCl$ and $LiAlCl_4$ which both are soluble in $SOCl_2$ and $SO_2Cl_2$. When $Li^+$ and $Cl^-$ do eventually combine, it will occur at some distance from the cathode where the harmful effects of cathode passivation are minimized.

DESCRIPTION OF THE PREFERRED EMBODIMENT

Increased cathode capacity is observed with the following half cell experiments.

A 0.07 cm² smooth carbon rod (working electrode), a large strip of lithium metal pressed into Ni Exmet screen (counterelectrode) and a lithium reference electrode (separated by a two solution buffer arrangment) are assembled in an all glass vessel in an argon filled dry box (less than 1 ppm water). The two solvents and two electrolyte salts are separately studied. The baseline experiments consist of using $LiAlCl_4$ dissolved in $SOCl_2$ and $SO_2Cl_2$. The tested salt, $(Bu)_4NAlCl_4$, is also dissolved in $SOCl_2$ and $SO_2Cl_2$. Thus, the two salts are tested against each other in both solvent systems with all other test conditions being identical. The working electrode is discharged at a constant current drain of 1.4 mA/cm² of cathode area.

The following TABLE shows that cathode capacity in both sulfuryl chloride and thionyl chloride half cells are dramatically increased when $(Bu)_4NAlCl_4$ electrolytes are used instead of the baseline $LiAlCl_4$ electrolyte.

TABLE

Room temperature cathode capacity at 1.4 mA/cm² for glassy carbon rods in various electrolytes

| electrolyte | cathode discharge time |
| --- | --- |
| 1.5 M $LiAlCl_4$—$SO_2Cl_2$ | ≦4 min |
| 1.0 M $(Bu)_4$ $NAlCl_4$—$SO_2Cl_2$ | 384 min |
| 1.0 M $LiAlCl_4$—$SOCl_2$ | 2 min |
| 1.0 M $(Bu)_4$ $NAlCl_4$—$SOCl_2$ | 205 min |

The high capacity lithium inorganic oxychloride electrochemical cells as described herein can be used in a long lived reserve cell. Such a cell may find use in RPV's (remotely powered vehicles).

We wish it to be understood that we do not desire to be limited to the exact details of construction as described for obvious modifications will occur to a person skilled in the art.

What is claimed is:

1. A high capacity lithium inorganic oxyhalide electrochemical cell comprising lithium as the anode, carbon as the cathode, and a solution of a quaternary ammonium salt in an inorganic oxyhalide solvent as the electrolyte wherein the quaternary ammonium salt is selected from the group consisting of tetrapropylammoniumtetrachloroaluminate and tetrabutylammoniumtetrachloroaluminate.

2. A high capacity lithium inorganic oxyhalide electrochemical cell according to claim 1 wherein the quaternary ammonium salt is tetrabutylammoniumtetrachloroaluminate.

3. A high capacity lithium inorganic oxyhalide electrochemical cell according to claim 2 wherein the inorganic oxyhalide solvent is sulfuryl chloride.

4. A high capacity lithium inorganic oxyhalide electrochemical cell according to claim 2 wherein the organic oxyhalide solvent is thionyl chloride.

5. A high capacity lithium inorganic oxyhalide electrochemical cell according to claim 1 wherein the inorganic oxyhalide solvent is sulfuryl chloride.

6. A high capacity lithium inorganic oxyhalide electrochemical cell according to claim 1 wherein the inorganic oxyhalide solvent is thionyl chloride.

* * * * *